United States Patent [19]

Peska et al.

[11] 4,055,510
[45] Oct. 25, 1977

[54] METHOD FOR MANUFACTURING OF SPHERICAL CELLULOSE PARTICLES

[75] Inventors: Jan Peška; Jiři Štamberg, both of Prague; Zdenko Blace, Neratovice, all of Czechoslovakia

[73] Assignee: Ceskoslovenska akademie ved, Prague, Czechoslovakia

[21] Appl. No.: 579,716

[22] Filed: May 21, 1975

[30] Foreign Application Priority Data

May 30, 1974   Czechoslovakia .................. 3858/74

[51] Int. Cl.$^2$ .......................... B01J 37/00; B01D 3/00
[52] U.S. Cl. .................................... 252/426; 252/448; 210/31 C; 106/164; 106/168
[58] Field of Search ............... 252/426, 448; 210/24 C

[56] References Cited

U.S. PATENT DOCUMENTS

| | | | |
|---|---|---|---|
| 3,179,587 | 4/1965 | Battista et al. | 210/24 C |
| 3,562,289 | 2/1971 | Battista et al. | 210/24 C |
| 3,597,350 | 8/1971 | Determann et al. | 210/24 C |
| 3,671,463 | 6/1972 | Colgan | 252/448 |
| 3,737,337 | 6/1973 | Schnoring et al. | 252/448 X |
| 3,864,327 | 2/1975 | Marchant | 252/426 X |

OTHER PUBLICATIONS

Chitumbo, K., et al. J. Polymer Sci: PT.C. No. 36, pp. 279-292 (1971).

*Primary Examiner*—Patrick P. Garvin
*Assistant Examiner*—John F. Niebling

[57] ABSTRACT

The invention relates to a method for manufacturing of spherical cellulose particles in bead form which enables to control the partial shape and porosity of the particles. Resulting cellulose sorbents are suitable carriers and materials for chromatography. The invented methods consists in heating a viscose (an aqueous solution of sodium cellulose xanthate) suspension in a water-immiscible liquid to 30°-100° C under stirring to form spherical droplets and solidify them and in the subsequent acidic decomposition of the solid xanthate globules either directly by addition of an acid soluble in the dispersion medium, or additionally after isolation and eventual washing of the particles to achieve the required wet volume. Liquids with the viscosity up to 100 cSt are advantageously used as dispersion medium and surfactants and/or modifying reagents (e.g. epichlorohydrine) may be added to the suspension.

14 Claims, No Drawings

METHOD FOR MANUFACTURING OF SPHERICAL CELLULOSE PARTICLES

Cellulose and its derivatives are widely used as chromatographic materials and polymeric carriers. Cellulose is mostly used in a form of fibers and powders for this purpose. These forms make the packing of columns difficult and exhibit a high flow resistance during application. This fact limits their use to small analytical columns and they are unsuitable for some techniques, as for example in the gel permeation chromatography.

To overcome these difficulties, materials were developed, consisting from particles having the shape of oblong micro cylinders, which are commercially available. They have a lower filtration resistance, but the disadvantages in packing and the resulting lower sharpness of separated zones remain.

As follows from the experience with other chromatographic materials, the ideal sorbent is formed by particles of the spherical shape and has a defined and controllable porosity. Several methods of preparation of cellulose bead gels are described in literature. Japan Pat. Nos. 73'21,738 and 73'60,753 start with viscose which is extruded by a high speed through a nozzle of the suitable size and coagulated in a common spinning bath. It is obvious, that this procedure requires a special rather complicated mechanical and technological equipment and that the control of a quality, especially of the product porosity, is difficult.

Another procedure described by Determann and Wieland in the French Pat. No. 1,575,419 and the U.S. Pat. No. 3,597,350 consists in dispergation of a suitable cellulose solution, advantageously the solution in the Schweitzer's reagent, in an organic solvent (benzene) containing a surfactant. The resulting suspension is coagulated by pouring into a solution of an acid in the solvent used as the dispersion phase. A similar method for manufacturing of cured cellulose beads is described in a work of Chitumbo and Brown: J. Polymer Sci. C36, 279 (1971). They started with technical viscose which was treated with epichlorohydrine in a suspension in chloroethanoe and then acidically coagulated in a large volume of a dichloroethane solution of acetic acid. The particles were then separated and crosslinking reaction with the present epichlorohydrine completed by heating to 120° C in an autoclave. These procedure have the disadvantage, that the coagulation takes place during pouring or overflowing the suspension, namely in the moment when the hydrodynamic parameters are changed. This change is accompanied by a change in the arrangement of the suspension. The resulting particles tend therefore to form agglomerates, conglomerate into irregular shapes and, if no special precautions are taken, a considerable fraction of particles is deformed. This disadvantage can be overcome in part by an extreme dilution during coagulation (90 g of cellulose suspended in 3 l of dichloroethane is coagulated with 6 l of a coagulation solution; Chitumbo loc. cit.), which is indeed paid by higher expenses.

A method according to this invention which has not the above mentioned disadvantages employs the fact, that the xanthation degree of the ripe viscose is decreased by heating and viscose loses its solubility. This allows to obtain shape-stable particles when the suspension of viscose in a water-immiscible liquid is heated to 30°-100° C without interruption of agitation under stationary hydrodynamic conditions. The primary globules obtained in this way may but need not be separated, before subjecting them to the acidic decomposition. If the products hardened by crosslinking are desired, the crosslinking agent (e.g. epichlorohydrine) may be added in any stage. Advantage of this procedure consists in using the smaller volumes of the coagulation bath, in the possibility to obtain the material readily in a globular form and, namely, in the easy control of porosity. The primary product behaves as a lightly crosslinked gel. Its substantial deswelling can be achieved by a suitable washing, e.g. with ethanol and methanol, and the structure, namely the wet volume, is fixted by the acidic decomposition or also by scorr-linking.

Medium of higher viscosity is advantageously used for dispergation of viscose in a water immiscible liquid, a liquid of the viscosity up to 100 cSt is prefered as the dispersion medium. The size of dispersed particles may be controlled above all by the viscosity of the dispersion medium, while the intensity of agitation, addition of a surfactant and density of the dispersion medium have rather the secondary effect.

Particles having a large bed volume, i.e. those with a large porosity, cannot be dried but are stored in water with addition of sodium azide (0.01%). They contract during drying and, eventually, they turn into glassy beads which are not able to swell to the original volume. Particles with the porosity below about 30% are dimensionally stable and can be dried.

The invention is further illustrated in several examples of performance without, however, limiting its scope by any means.

EXAMPLE 1

Technical viscose (100 g containing 8.2% of cellulose and 6% NaOH, $\gamma = 40$) was dispersed in 400 ml of transformer oil (viscosity 26 cSt) in a 1 liter sulfonating flask at the laboratory temperature and agitation by 460 r.p.m. The suspension was heated for 1.5 hr to 90° C under continuous stirring, filtered and the solid was immediately washed with ethanol. The decomposition of cellulose xanthate was completed by stirring in a solution of 20 ml of acetic acid in 80 ml of ethanol for one hour. After thorough washing with benzene, ethanol and water and drying in vacuum, 32.8 ml of macroporous globules was obtained; the fraction of diameter 0.35–0.15 mm amounted to 85 vol.%.

EXAMPLE 2

A suspension of 100 g of viscose in 300 ml of transformer oil was heated for 1.5 hr to 90° C as in Example 1, cooled down, filtered and the solid was washed successively with benzene and ethanol for 1 hr on a fritted glass filter and subjected to the acidic decomposition as in Example 1. After thorough washing, 57 ml of spherical particles was obtained. The following composition was ascertained by wet screen analysis: 0.25–0.16 mm 49%, 0.16–0.125 mm 21%, 0.125–0.09 mm 23% and 0.09–0.08 mm 3%. The sorbent was stored in water with addition of 0.01% of sodium azide. A dried sample had a vitreous appearance and a bulk density 0.82 g/ml.

EXAMPLE 3

A suspension of 100 g of viscose in 300 ml of chlorobenzene was processed in the same way as in Example 1; 33 ml of the wet sorbent was obtained which had the following composition by wet screen analysis: 1–0.75 mm 49%, 0.75–0.63 mm 34%, 0.63–0.50 mm 2% and 0.50–0.40 mm 3%.

EXAMPLE 4

A suspension of viscose in a mixture of chlorobenzene and mineral oil VT (1:1 v/v, viscosity 4.2 cSt) was processed in the same way as in Example 2. The resulting 55 ml of the wet sorbent was separated into fractions: 1–0.75 mm 2%, 0.75–0.63 mm 4.5%, 0.63–0.50 mm 1.9%, 0.50–0.40 mm 21%, 0.40–0.31 mm 32%, 0.31–0.25 mm 23%, 0.5–0.16 mm 13% and 0.16–0.125 mm 0.5%.

EXAMPLE 5

A suspension of 100 g of viscose in a 5% solution of polystyrene in chlorobenzene (viscosity 7.74 cSt) was heated with agitation at 300 r.p.m. similarly as in Example 1, filtered and the solid was washed with methanol and decomposed by stirring in a 10% aqueous solution of sulfuric acid. After washing, 73 ml of the wet globular sorbent was obtained which was separated into fractions 1–0.75 mm 42%, 0.75–0.63 mm 36%, 0.63–0.50 mm 5%, 0.50–40 mm 8.5% and 0.40–0.31 mm 1.5%.

EXAMPLE 6

A suspension of 100 g of viscose in 300 ml of chlorobenzene and 300 mg of technical sodium dodecyl benzene sulfonate (Mersolate, 50% of dry material, the average length of alkyl $C_{12}$) was heated in the same way as in Example 1. After cooling to 35° C, a solution of 50 ml of acetic acid in 50 ml of chlorobenzene was poured into the agitated suspension. After filtration and washing, 84 ml of the sorbent was obtained which had following composition by wet screen analysis: 1–0.75 mm 9%, 0.75–0.63 mm 17%, 0.63–0.50 mm 13%, 0.50–0.40 mm 29% and 0.40–0.31 mm 6.5%.

EXAMPLE 7

A suspension of 100 g of viscose in 300 ml of transformer oil was heated similarly as in Example 1 under agitation at 330 r.p.m., filtered and the solid was successively washed with benzene and ethanol and decomposed in the same way as in Example 1. After washing, 43.7 ml of the wet sorbent was obtained which had the screen analysis 0.31–0.25 mm 0.5%, 0.25–0.16 mm 91%, 0.16–0.125 mm 5% and 0.125–0.09 mm 2%.

EXAMPLE 8

Epichlorohydrine (6.5 g) was added to a suspension of 100 g of viscose in 300 ml of transformer oil under agitation at 460 r.p.m. The suspension was heated as in Example 1, filtered and the solid was washed with benzene and ethanol and decomposed as in Example 1. It was obtained 63 ml of beads having the screen analysis: 0.25–0.16 mm 28%, 0.16–0.125 mm 14%, 0.125–0.09 mm 44% and 0.09–0.08 mm 8%.

EXAMPLE 9

A suspension of 100 g of viscose in 300 ml of transformer oil was heated as in Example 1, filtered and the solid was washed with benzene, methanol and water. The decomposition was completed with 10% sulfuric acid for 1 hr at 35° C. After washing, 59.5 ml of beads was obtained which had the screen analysis: 0.25–0.16 mm 70%, 0.16–0.125 mm 12%, 0.125–0.09 mm 10% and 0.09–0.08 mm 1%.

We claim:

1. A method of producing spherical cellulose particles, which consists of the sequence of steps of providing a dispersion of viscose droplets in a water-immiscible liquid, heating such dispersion at a temperature of at least 30° to 100° C. with continuous agitation under stationary hydrodynamic conditions for a time sufficient to partially regenerate the cellulose in the viscose and to thereby, and solely as a result of said heating, solidify the viscose droplets into shape-stable particles, and thereafter completing the regeneration of the cellulose in such solidified viscose droplets by treatment with an added acid.

2. A method according to claim 1, in which the water-immiscible liquid has a viscosity up to 100 cSt.

3. A method according to claim 2, in which the water-immiscible liquid comprises chlorobenzene.

4. A method according to claim 2, in which the water-immiscible liquid comprises a solution of polystyrene in chlorobenzene.

5. A method according to claim 2, in which the water-immiscible liquid comprises a transformer oil.

6. A method according to claim 1, in which the acid comprises acetic acid.

7. A method according to claim 1, in which the acid comprises sulfuric acid.

8. A method according to claim 1, in which the acid regeneration of the heat-solidified particles is effected directly in the dispersion medium.

9. A method according to claim 1, in which the heat-solidified particles are separated from the dispersion medium, and such separated particles are then subjected to the acid regeneration.

10. A method according to claim 9, in which the separated particles are washed with an organic solvent prior to the acid regeneration.

11. A method according to claim 10, in which the organic solvent comprises methanol or ethanol.

12. A method according to claim 1, in which the dispersion includes a surface-active agent.

13. A method according to claim 12, in which the surface-active agent comprises sodium dodecyl benzene sulfonate.

14. A method according to claim 1, in which the heating is effected at 90° C.

* * * * *